United States Patent [19]
Isogai et al.

[11] Patent Number: 5,229,563
[45] Date of Patent: Jul. 20, 1993

[54] PRESSURE COOKER

[75] Inventors: Mamoru Isogai, Yamatokoriyama; Masao Maki, Nabari; Takahito Ishii, Kyoto; Shigeki Ueda, Yamatokoriyama; Satoru Kodama, Nara; Seiji Ito, Yamatokoriyama, all of Japan

[73] Assignee: Matsushita Electric Industrial Co., Ltd., Osaka, Japan

[21] Appl. No.: 639,498

[22] Filed: Jan. 9, 1991

[30] Foreign Application Priority Data

| Jan. 11, 1990 | [JP] | Japan | 2-4180 |
| Jan. 19, 1990 | [JP] | Japan | 2-11405 |
| Jan. 19, 1990 | [JP] | Japan | 2-11406 |
| Mar. 7, 1990 | [JP] | Japan | 2-55296 |
| Apr. 27, 1990 | [JP] | Japan | 2-113347 |

[51] Int. Cl.⁵ .............. H05B 6/80; B60L 1/02
[52] U.S. Cl. .................. 219/10.55 E; 219/10.55 M; 219/10.55 F; 99/DIG. 14; 99/330; 99/331; 220/203
[58] Field of Search ............. 219/10.55 R, 10.55 B, 219/10.55 F, 10.55 M; 99/DIG. 14, 330, 331, 332, 342; 220/203, 204, 316, 319; 428/34.5, 36.4, 411.1, 419, 447; 525/374, 375; 524/423, 424, 425

[56] References Cited

U.S. PATENT DOCUMENTS

| 2,622,187 | 12/1952 | Welch | 219/47 |
| 3,777,099 | 12/1973 | Levinson | 219/10.55 E |
| 3,941,967 | 2/1976 | Sumi et al. | 219/10.55 E |
| 4,396,745 | 8/1983 | Ikeguchi | 525/374 |
| 4,490,597 | 12/1984 | Mengel | 219/10.55 E |
| 4,796,776 | 1/1989 | Dalquist et al. | 99/330 |
| 4,917,957 | 4/1990 | Nitoh et al. | 428/447 |
| 4,933,386 | 6/1990 | Nitoh et al. | 524/425 |
| 5,028,461 | 7/1991 | Nakamichi | 428/34.5 |

FOREIGN PATENT DOCUMENTS

| 0112295 | 6/1984 | European Pat. Off. . |
| 52-132964 | 11/1977 | Japan . |
| 59-223753 | 12/1984 | Japan . |
| 63-092918 | 4/1988 | Japan . |
| 1-259918 | 10/1989 | Japan . |
| 2-004130 | 1/1990 | Japan . |

*Primary Examiner*—Bruce A. Reynolds
*Assistant Examiner*—Tuan Vinh To
*Attorney, Agent, or Firm*—Panitch Schwarze Jacobs & Nadel

[57] ABSTRACT

A pressure cooker and a process for making the same, wherein the pressure cooker includes a pressure container for accommodating food to be cooked, a lid for covering the container in an airtight manner, a pressure control device for adjusting the internal pressure in the container, wherein the container or the lid or both are partly or wholly made of a composite resin consisting essentially of polyphenylene sulfide resin and 30 wt % to 50 wt % glass fiber.

10 Claims, 11 Drawing Sheets

Prior Art

Fig. 12(a)

Prior Art

Fig. 12(b)

Prior Art

PRESSURE COOKER

BACKGROUND OF THE INVENTION

1. Field of the Invention

The present invention relates to a pressure cooker adapted for use in an electric range such as a microwave oven, and a process for making such pressure cookers, wherein the pressure cooker includes a pressure container in which food is confined and cooked at an elevated temperature under high pressure.

2. Description of the Prior Art

Known pressure cookers are provided with a pressure container in which food is cooked at an elevated temperature under a high internal pressure built up by vapor emitting from the food. The high temperature atmosphere raises the boiling point of the food up to a particular cooking temperature. The advantage of a pressure cooker is that tenderness and flavor are imparted to the food. This type of pressure cooker is adapted for use in an electric range, such as a microwave oven, in which the food is cooked at high temperatures generated by microwave.

A typical example of the known pressure cookers will be described in greater detail by referring to FIG. 10:

A pressure cooker 40 includes a pressure container 41 and a lid 42 airtightly covering the container 41 by means of a rubber sealing 43, wherein the container 41 and the lid 42 are made of thermosetting unsaturated polyester resin. The internal pressure is adjusted by a valve 44 so as to achieve an optimum cooking pressure in the pressure container. A safety valve 45 is provided for vapor to escape if pressure builds up beyond a predetermined value.

A pressure effective to cook food (hereinafter called "working pressure") depends upon the nature of foods; common pressure containers work at a working pressure of about 2 atms, others work at about 1.7 atms, and others at about 1.4 atms. By selecting a working pressure, the pressure cooker is used for cooking particular foods. For example, a working pressure of 1.7 atms is suitable for cooking meat, and that of 1.4 atms is suitable for boiling rice.

Figure 12A:
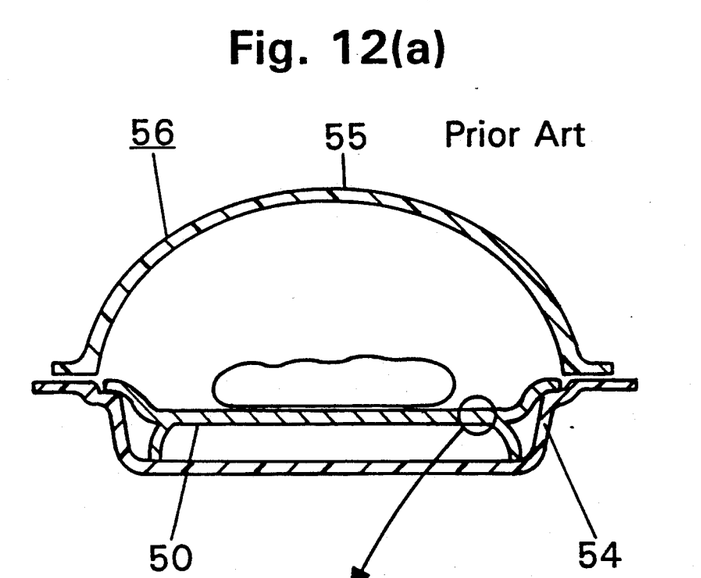
FIG. 12(a) shows an entire cross-section and FIG. 12(b) is a fragmentary view on an enlarged scale showing the layered structure of the heating plate.
Figure 12B:
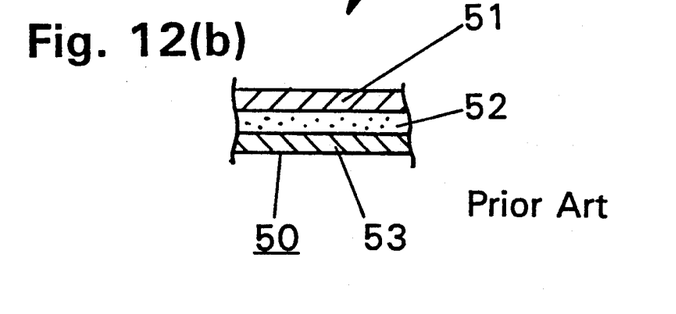

Other typical examples of the known pressure cookers is shown in FIGS. 12(a) and (b). The illustrated cooker 56 includes a heating plate 50 which is composed of a top layer 51 and a silicon rubber layer 53 with a ferrite layer 52 as a microwave absorber sandwiched therebetween, a tray 54, and a cover 55.

This type of cooker is popular among users, particularly housewives, because of the feasibility of leaving burnt traces on the cooked food as seen in grilled steak. However, a problem is that a thick food is likely to have an uncooked portion in spite of the apparent burnt-traces on the surface. To solve this problem, there is a proposal for steaming the burnt-traced food. However, the steaming requires a sufficiently airtight sealing of the container, otherwise the steam would escape from the container. Also, inadequate steaming spoils the taste and flavor of the food. The steaming process is only suitable for thin food that is previously prepared to some extent.

However, some foods such as unmilled rice, beans, and small bony fish are not palatably cooked at atmospheric pressures. However, most of the known pressure cookers are not designed to operate on an increased working pressure. This is due to the fact that the unavailability of a sufficiently tough material is a bottleneck for constructing such pressure cookers.

A pressure cooker for an electric range such as a microwave oven must satisfy at least the following requirements:

(1) It enables an even radiation of microwaves;

(2) It can withstand higher temperatures than 200° C. in anticipation of any abnormal situations, such as excessive absorption of microwave and extraordinary rise in temperature due to an erroneous switch-on of the heater for the pressure container;

(3) It must have a high breaking strength at 120° C. under 2 atms; and (4) It must be safe from discoloring, increased breaking strength, etc., which would be likely to cause a hygiene problem.

The known pressure cookers are made of unsaturated thermosetting resin such as polyester which is inherently resistant to heat, but polyester is fragile at increased internal pressures. Other problems are that they are likely to contaminate the cooking food by discoloration occurring at the presence of seasoning ingredients such as soy sauce, and decreased breaking strength mainly due to hydrolysis (a test revealed that the tensile strength was reduced by 50 wt % at 120° C. for 100 hours). This shows that pressure cookers are not suitable for everyday use.

SUMMARY OF THE INVENTION

The pressure cooker of this invention, which overcomes the above-discussed and numerous other disadvantages and deficiencies of the prior art, comprises a pressure container for accommodating food to be cooked, a lid for covering the container in an airtight manner, a pressure control device for adjusting the internal pressure in the container, wherein the container or the lid or both are partly or wholly made of a composite resin consisting essentially of polyphenylene sulfide resin and 30 wt % to 50 wt % glass fiber.

In a preferred embodiment, the composite resin has a tensile strength of 500 kg/cm² to 2500 kg/cm².

In a preferred embodiment, the pressure cooker comprising a pressure container for accommodating food to be cooked, a lid for covering the container in an airtight manner, a pressure control device for adjusting the internal pressure in the container, and a safety valve for escaping excess vapor inside, wherein the container or the lid or both are partly or wholly made of a composite resin consisting essentially of polyphenylene sulfide resin and 30 wt % to 50 wt % glass fiber.

In a preferred embodiment, the container comprises a cooking tray disposed at a distance from the inside bottom thereof.

In a preferred embodiment, the cooking tray comprises a microwave absorptive layer in a portion thereof on which the cooking food is placed.

In a preferred embodiment, the container or the lid or both have fluororesin coatings in the portions which come into contact with the cooking food.

According to another aspect of the present invention, the pressure cooker comprises a pressure container for accommodating food to be cooked, a lid for covering the container in an airtight manner, a pressure control device for adjusting the internal pressure in the container, wherein the container or the lid or both are partly or wholly made by an injection molding process with the use of a composite resin consisting essentially of polyphenylene sulfide resin and 30 wt % to 50 wt % glass fiber.

According to the present invention, the pressure cooker having a pressure container, a lid for covering the container, and a pressure control aperture is produced by a process which comprises the step of making the container or the lid or both wholly or partly with a composite resin consisting essentially of polyphenylene sulfide resin and 30 wt % to 50 wt % glass fiber by injection, wherein the pressure control aperture is closed during the injection process and mechanically completed after the injection process is finished.

According to another aspect of the present invention, a pressure cooker having a pressure container, a lid for covering the container, and a pressure control aperture is produced by a process which comprises the step of making the container or the lid or both wholly or partly of a composite resin consisting essentially of polyphenylene sulfide resin and 30 wt % to 50 wt % glass fiber by injection, wherein a plurality of sprues are produced in the portions made of the composite resin such that at least two of the sprues are situated at opposite positions with the pressure control aperture being interposed therebetween.

Thus, the invention described herein makes possible the following objectives; (1) providing a pressure cooker having high breaking strength, (2) providing a pressure cooker capable of protecting the pressure container against blowing up owing to the build-up of vapor emitting from the cooking food, (3) providing a pressure cooker capable of double cooking by heating and steaming, (4) providing a pressure cooker capable of imparting burnt-traces on the surface of the cooked food, and (5) providing a pressure cooker constructed so as to be resistant to chemicals or any other corrosive ingredients contained in food, thereby eliminating the possibility of contaminating the food.

BRIEF DESCRIPTION OF THE DRAWINGS

This invention may be better understood and its numerous objects and advantages will become apparent to those skilled in the art by reference to the accompanying drawings as follows:

FIG. 9 is a diagrammatic view exemplifying a process of making a pressure cooker according to the present invention, wherein

FIG. 10 is a diagrammatic view exemplifying a process of making a pressure cooker according to another aspect of the present invention, wherein

FIG. 12 is a cross-sectional view showing another type of pressure cooker in common use, wherein

DESCRIPTION OF THE PREFERRED EMBODIMENT

Figure 1:
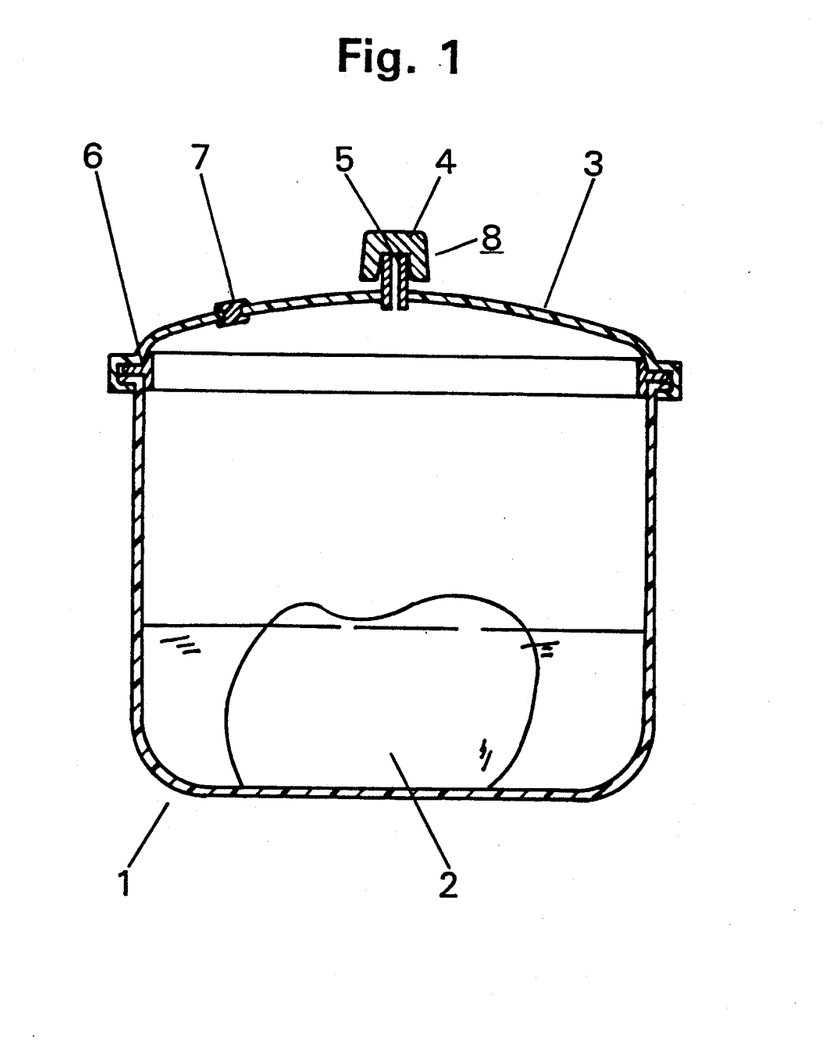
FIG. 1 is a cross-sectional view showing a pressure cooker according to the present invention.

Referring to FIG. 1, the pressure cooker includes a pressure container 1 and a lid 3 airtightly covering the container 1 with the interposition of a rubber seal 6, wherein the container 1 and the lid 3 are made of polyphenylene sulfide resin and 30 wt % to 50 wt % glass fiber by an injection molding process. Hereinafter, the pressure container will be referred to as "container".

The lid 3 is provided with a pressure control valve 8, which includes a weight 4 softly covering a nozzle 5 connected to the inside of the container 1. The structure and position of the pressure control valve 8 are not limited to the illustrated example. The lid 3 is additionally provided with a safety device 7 made of rubber, bushing or the like.

Polyphenylene sulfide resin is thermoplastic, having a chemical structure represented by and is mainly obtained by reacting 1,4-dichlorobenzene and sodium sulfide ($Na_2S$). There are at least three types; one is a cross-link type, another is a linear type, and a third is a semi-cross-link type. The cross-link type, having a large molecular weight, is hard and heat-resistant but is not extensible and fragile against shocks as Discoloration is less likely to occur by heat. The linear type, having small molecular weight, is extensible and has sufficient strength against shocks as compared with the cross-link type. Discoloration is likely to occur by heat. The semi-cross-link type has an increased tensile strength and striking strength. Discoloration is less likely to occur. Any of these types are liable to accelerated cross-linking at 250° C., and bridged by oxygen, thereby becoming hard and changing into brown. So long as the temperatures are below 200° C., the semi-cross-link type is preferable.

Polyphenylene sulfide resins are permeable to microwaves, and is tough enough to withstand the microwave irradiation. When microwaves transmitted through the wall of the cooker raises the inside temperature, the vapor emitted from the food increases the internal pressure. Because of the addition of glass fiber, the pressure cooker has sufficient strength as compared to when polyphenylene sulfide resin is singly used. An optimum quantity of glass fiber is in a range of 30 wt % to 50 wt %. If the quantity is less than 30 wt %, a desired enhancement of strength is not achieved, and bubbles occur which make it difficult to inject the molten resin through a nozzle of an injecting machine. If it exceeds 50 wt %, the resin becomes hard and fragile against shocks. In addition, it becomes difficult to mold by injection. The glass fiber is preferably cut into piles having a length of 0.1 mm to 0.4 mm, preferably 0.2 mm, and a diameter of 10 μm. If the piles are shorter than 0.1 mm, the strength is decreased, and if they are longer than 0.4 mm, the piles are difficult to disperse and/or liable to breakage. Preferably the surfaces of piles are treated with a silane coupling agent so as to increase the surface adhesion of them.

The internal pressure in the container 1 reaches about 2 kg/cm$^2$, and the internal temperature reaches about 120° C. Therefore the material must withstand the internal pressure of about 2 kg/cm$^2$ and the high temperature of about 120° C. In addition, safety, reliability and hygiene must be taken into consideration for actual use. In general, the strength of resins is reduced by 50 wt % at 120° C. as compared with the strength at room temperatures. The safety device 7 and safety valve 8 are employed so as to enhance the safety of the pressure cooker, which are designed to operate under a pressure of at least 2 kg/cm$^2$. Resins tend to deteriorate over a long period of use, to such an extend that the initial strength decreases by 50 wt %. When these factors are taken into consideration, the pressure cooker is preferably manufactured so as to have a strength of 2 kg/cm$^2 \times 4$. The tensile strength of resins is preferably more than 500 kg/cm$^2$, but when it exceeds 2,500 kg/cm$^2$, the moldability is reduced and the resulting container becomes fragile. An optimum quantity is about 40 wt % so as to achieve the desired moldability and strength.

When resin alone is placed in a microwave oven, and irradiated with microwaves, the temperature rises above 200° C. Polyphenylene sulfide resin has many advantages:

(1) It withstands high temperature such as 260° C.;
(2) It is non-inflammable and self-extinguishable;
(3) It is resistant to chemicals, seasoning ingredients and salt contained in food, thereby eliminating the possibility of contaminating food, and is nonhydroscopic. An inorganic filler such as calcium carbonate is added up to 30 wt %, preferably 15 wt % to 25 wt %, so as to prevent reduction in strength and moldability when the resin is molded.

In this way, when polyphenylene sulfide resin is injected into a mold so as to make a pressure cooker, no substantial difference occurs between the outside wall-surface and the inside wall-surface, thereby making it possible to increase the pressure-resistance without trading off the heat-resistant property.

So long as the required strength of the container 1 and the lid 3 are maintained, other resins can be used instead of polyphenylene sulfide resin. For example, it is possible to make the side wall of the container 1 and the lid 3 of transparent resin, thereby enabling a user to observe the food being cooked. Alternatively, polyphenylene sulfide resin is used to make that portion of the container 1 that is most subjected to stress, and the other portion is made of ordinary plastics. In this case the container 1 is made of different materials by a known dichroic molding process.

Figure 2:
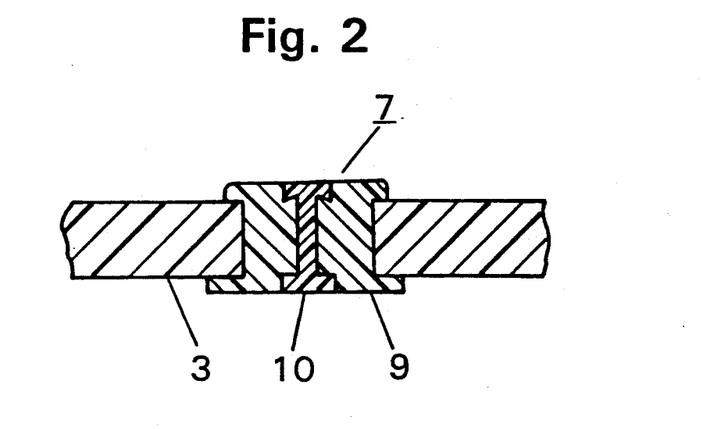
FIG. 2 is a cross-sectional view showing a safety valve.

Referring to FIG. 2, the safety device 7 includes a block 9 embedded in the lid 3, the block 9 having an aperture in which a core 10 is fitted. The core 10 is made of polyethylene of high density having a melting point of 130° C.

A first experiment was conducted by closing the pressure control valve 8 deliberately, and pouring water into the container 1. Then, the container 1 was airtightly closed with the lid 3, and was irradiated with microwaves. After some time, the internal pressure and temperature arose. When the internal pressure reached a little before 3 atms (about 130° C. in terms of temperature), the core 10 melted to allow the vapor inside to escape through the aperture. The container 1 was protected from a potential explosion from the build-up of vapor. A second experiment was conducted by removing the safety valve 7, and the void portion was likewise closed. When the internal pressure reached beyond 5 atms, the container and the microwave oven blew up.

Figure 3:
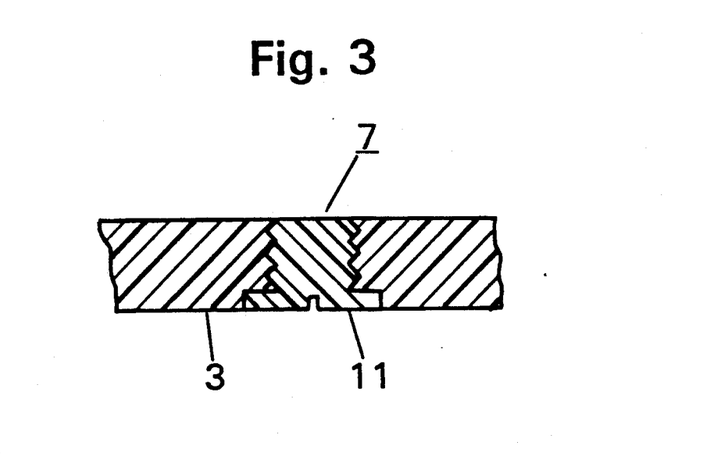
FIG. 3 is a cross-sectional view showing a modified version of the safety valve.

Referring to FIG. 3, a modified version of the safety valve will be described:

A screw 11 of polyethylene of high density is embedded in the lid 3. An experiment showed that when the internal pressure reaches 3 atms, the plastic screw 11 melted, thereby avoiding a detrimental buildup of heat. The internal pressure was reduced to atmospheric pressure.

Figure 4:
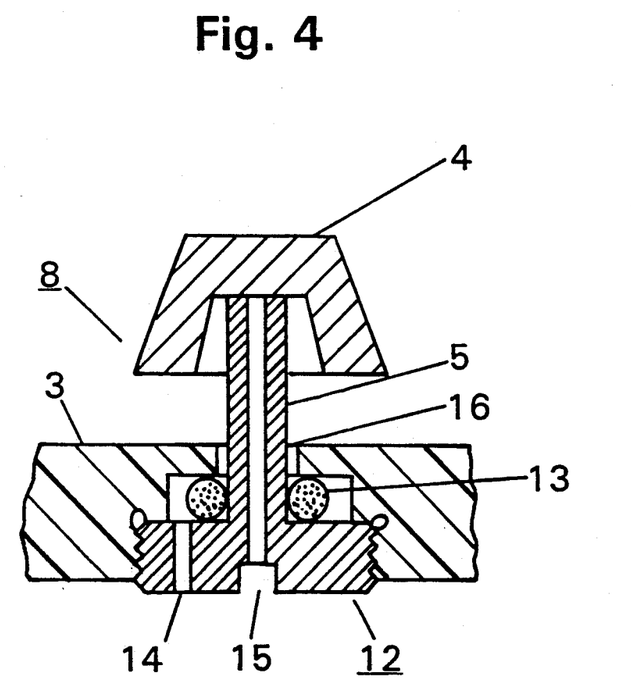
FIG. 4 is a cross-sectional view showing a safety valve incorporated in a pressure control valve.

Referring to FIG. 4, a further modified version of a pressure control valve will be described:

The modified pressure control valve 12 is provided with an O-ring 13 of polyethylene of high density disposed between the lid 3 and the nozzle 5, which has a bore 14 and a recess 15 for engagement with the lid 3. The reference numeral 16 denotes a space produced between the lid 3 and the nozzle 5. An experiment was conducted by closing the nozzle 5 deliberately, and following the same procedure as that described in the above-mentioned experiments. When the internal pressure reached 130° C., the O-ring 13 melted, thereby allowing the internal pressure to escape through the bore 14 and the space 16. The excessive build-up of vapor inside was avoided.

To secure a double safety system, it is possible to equip the container with the safety valve 7 in addition to those shown in FIGS. 2 and 3. It is also possible to make the nozzle 5 out of high density polyethylene. The reason for selecting 130° C. is based on the observation that the internal pressure in the container 1 normally reaches 120° C. at about 2 atms with plus and minus variations. For safety, it is desirable to set a temperature slightly higher than the temperatures reached in the normal course of use. If the temperature reaches higher than 135° C., the internal pressure will amount to 3 atms or more, thereby causing the vapor to burst violently through the safety valve. The violent burst of hot vapor is harmful to the user. Thirdly, manufacturing irregularities must be taken into consideration. Based upon the three considerations, resins workable at 130° C. should be used. In the illustrated embodiments the container 1 and the lid 3 are made of PPS resin, but any materials that are resistant to heat and pressure, having transmissibility of microwaves, can be used; for example, polysulfone resin, polyetheretherketon resin, polyethersulfone, polyamide-imide resin, polyoxymethylene resin, and polyetherimide resin. In the illustrated embodiment the safety valve is made of high density polyethylene but can be made of poly 1, 2-butadience or the like.

Figure 5:
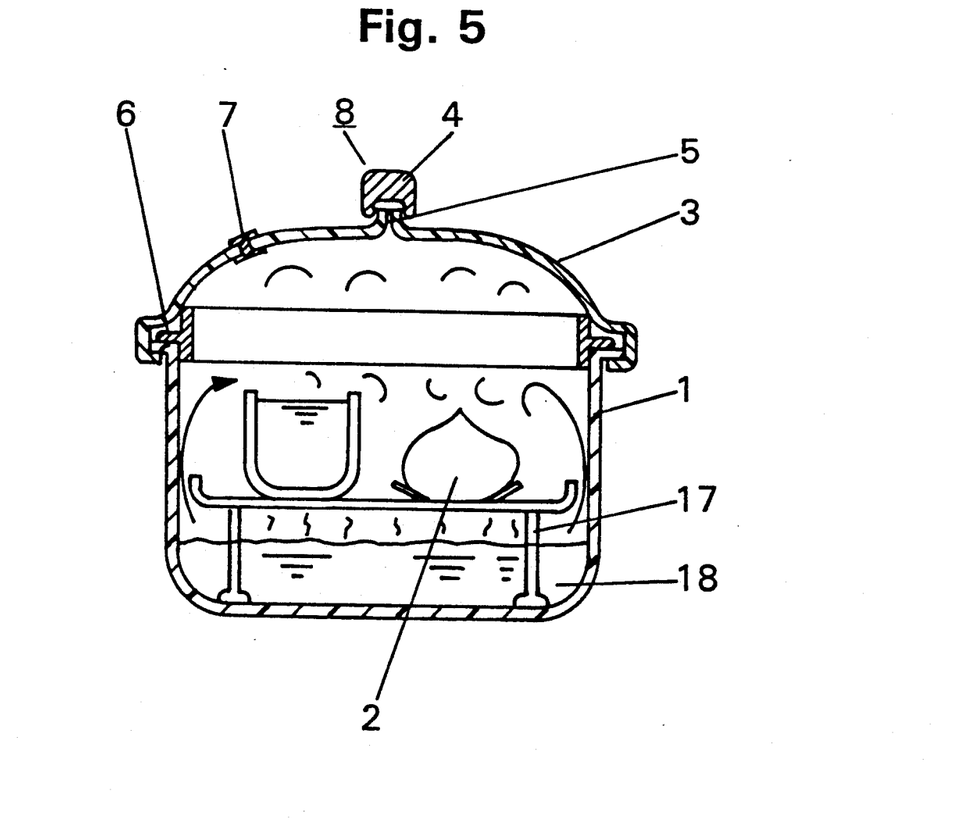
FIG. 5 is a cross-sectional view showing a pressure cooker of FIG. 1, having a cooking tray inside.

Referring to FIG. 5, in which like components and parts are designated by like reference numerals to those in FIGS. 1 to 4, a modified version of the container will be described:

This example is characterized in that the container 1 is provided with a cooking tray 17, and holds a small portion of water 18 under the tray 17. The water, when it is heated, generates steam which cooks meat, dough, fish or the like. The tray 17 can have a grilled portion where food is placed.

Figure 6:
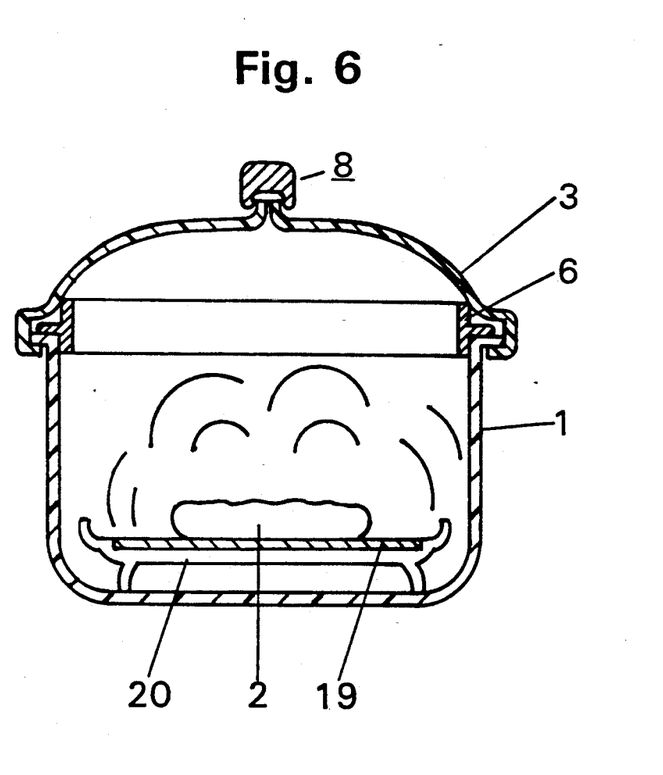
FIG. 6 is a cross-sectional view showing a pressure cooker of FIG. 1, in which food is placed on a cooking tray.

As shown in FIG. 6, a further modified version of the container 1 will be described:

A tray 20 includes a microwave absorptive layer 19, whereby burnt traces are formed on the food like a grilled steak. Likewise, water can be held under the tray 20 which can have a grill portion where the food is placed.

Figure 7:
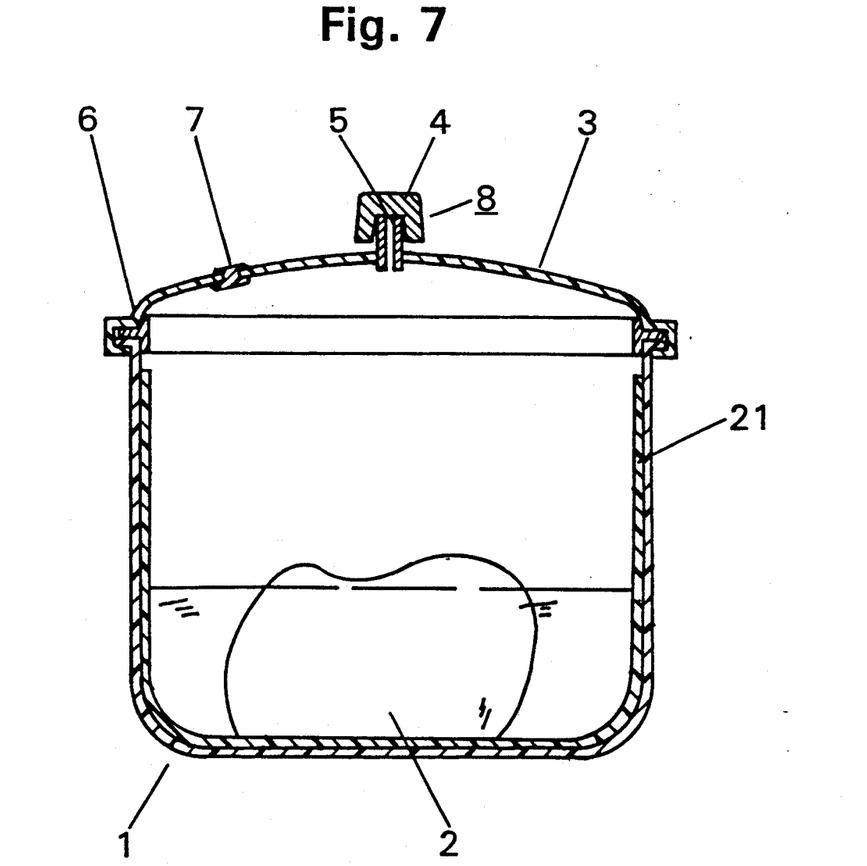
FIG. 7 is a cross-sectional view showing a pressure cooker having an inside wall coated with fluororesin.

FIG. 7 shows a container 1 which has its inside wall coated with a fluororesin layer 21. The fluororesin layer 21 guarantees the lasting heat and pressure resistance over a long period of use at 220° C., and there was little possibility of discoloration and/or reduced strength which would otherwise result from the seasoning ingredients and water contained in the food. Tests demonstrated that when polyphenylene sulfide resin was singly used, color difference was less than 2, and 70 wt % of the initial strength was maintained at 120° C. after 1,000 hours (by a pressure cooker test), whereas when the fluororesin layer 21 was coated on the inside wall of the container 1, color difference was reduced to "1" or less, and that 85 wt % of the initial strength was maintained. As a result, the pressure cooker can be used over a long period of time. Because of the coverage of the fluororesin layer 21, the container 1 can be made of any other material than polyphenylene sulfide resin in spite of their less water-proof property. The fluororesin layer 21 can be formed on the outside wall of the container 1 and/or the inside surface of the lid 3 in addition to the inside wall.

Figure 8:
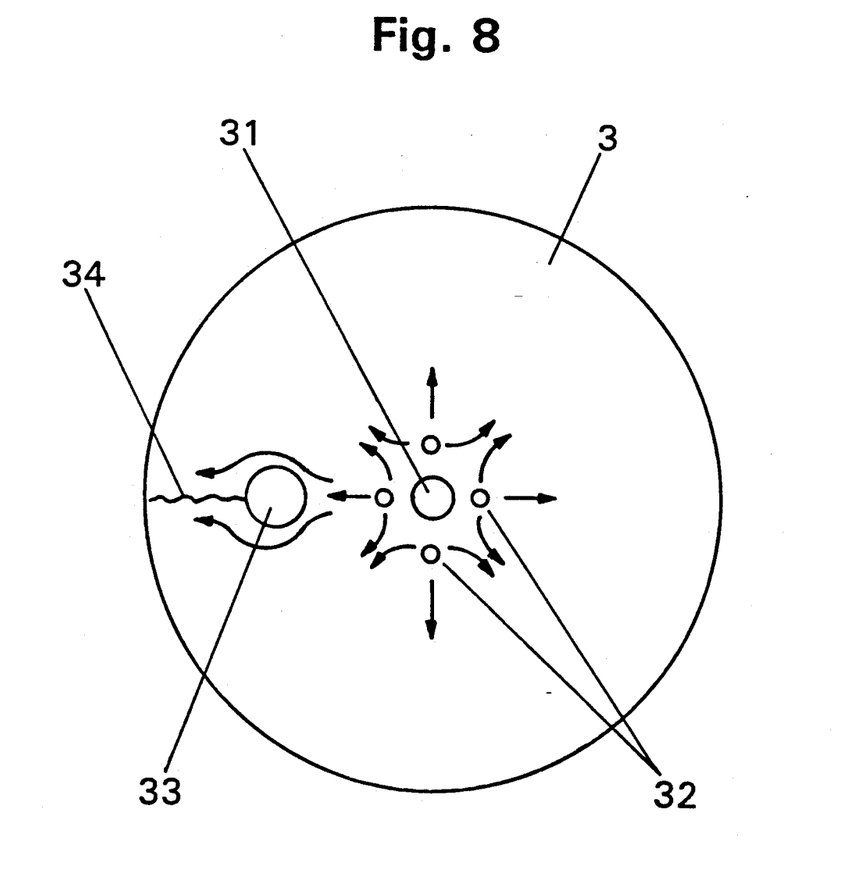
FIG. 8 is a plan view of a lid showing the occurrence of a weld line.

As described above, the container 1 includes apertures passed therethrough, in the form of the nozzle 5 and the safety device 7. In the process of molding the container 1 with thermoplastic resin by injection, weld line occurs owing to the streams of molten plastic as shown in FIG. 8. More specifically, the reference numeral 31 denotes an aperture for the nozzle 5 around which four gates (sprues) 32. To mold articles with thermoplastic, it is the common practice to provide such gates in the center so as to enable the molten plastic to flow evenly, thereby producing the articles to exact dimension as desired. In the case of the container 1, the gates 32 are provided around the aperture 31 so as not to overlap it. The molten plastic flows through the four gates 32 in the respective directions as indicated by the arrows. The reference numeral 33 denotes an aperture for the safety device 7, the aperture having a pin of the mold inserted in the injection molding process. The molten plastic flows along the periphery of the pin. Behind the pin the two flows collide with each other to form an abutment line 34, commonly called "weld line". The problem of the weld line 34 is that the glass fiber added to increase the strength of the container 1 becomes absent in the weld line, thereby decreasing the strength as a whole.

Figure 9A:
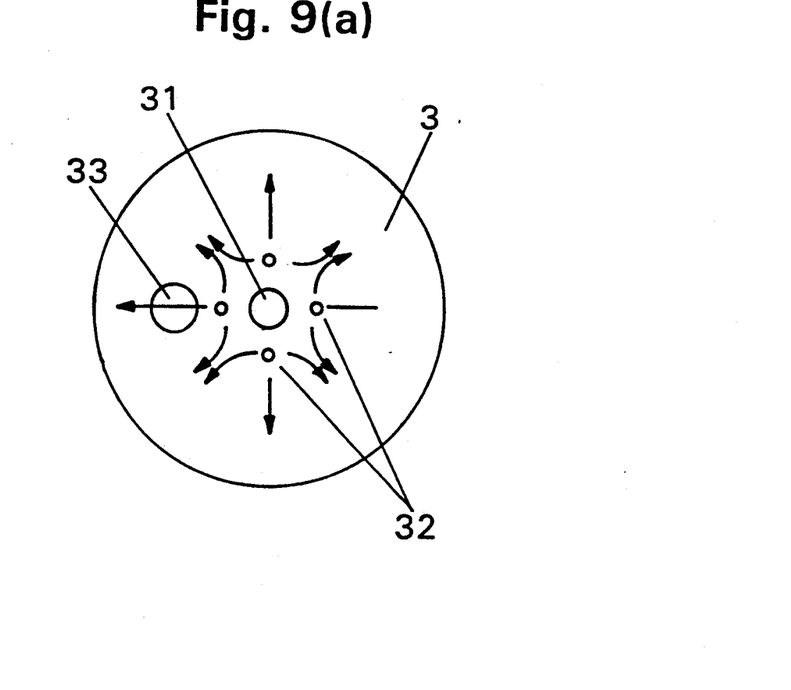
FIG. 9(a) is a plan view of a lid.
Figure 9B:
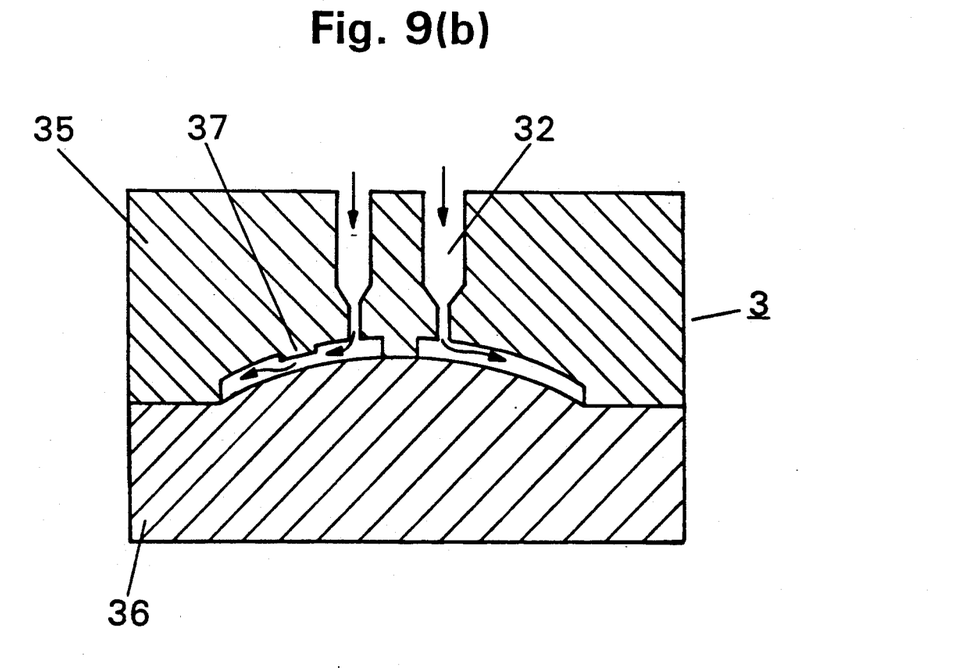
FIG. 9(b) is a cross-sectional view showing an injection mold.

The problem of the weld line is fatal to the production of pressure cookers by an injection molding process, and in order to solve the problem, the present invention provides the following solutions:

FIG. 9(a) shows one of the solutions. The aperture 33 is closed when the injection molding process is carried out. The mold is halved into an upper mold 35 and a lower mold 36. The molten plastic is poured into a cavity in the mold through gates 32 produced in the upper mold 35. The upper mold 35 is provided with a pin 37 which is not long enough to pass through the lid 3 but projects slightly into the aperture 33 so as to form a thin portion in the lid 3, thereby enabling the molten plastic to flow over the pin 37 as shown in FIG. 9(b). Thus, the weld line is prevented from occurring owing to the by-passing as shown in FIG. 8.

After the injection molding is finished, the thin portion of the lid 3 is mechanically bored to fabricate the safety device 7. The mechanical boring does not reduce the strength of the container 1. A comparative test showed that a testpiece (i.e. the lid) shown in FIG. 8 fractured under a hydraulic pressure of 6 kg/cm$^2$ (gauge pressure), but that a testpiece shown in FIG. 9 withstood a hydraulic pressure of 10 kg/cm$^2$ (gauge pressure).

It is also possible to close the central aperture 31 for the nozzle 5 deliberately in addition to the closure of the aperture 33 for the safety device 7, and provide a single large gate instead of the four small gates 32. The other process is the same as described above, that is, after the injection molding is finished, the mechanical boring is carried out so as to produce two apertures 31 and the safety device 7. The same desirable results were obtained.

Figure 10A:
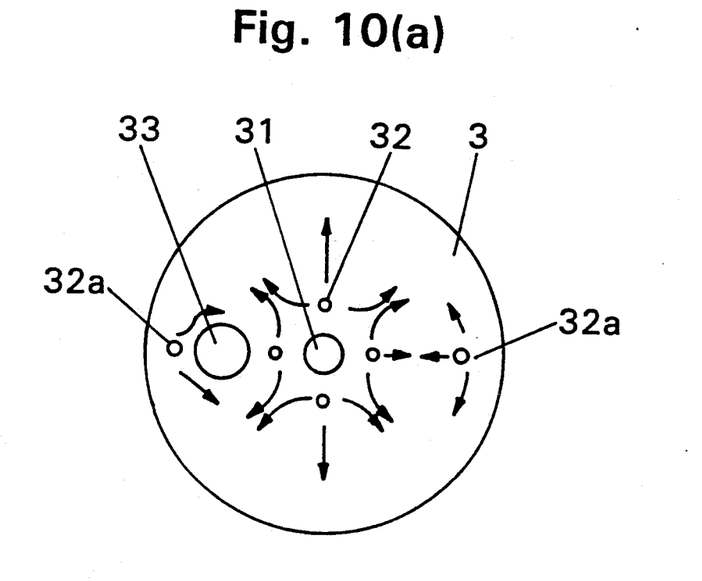
FIG. 10(a) is a plan view of a lid.
Figure 10B:
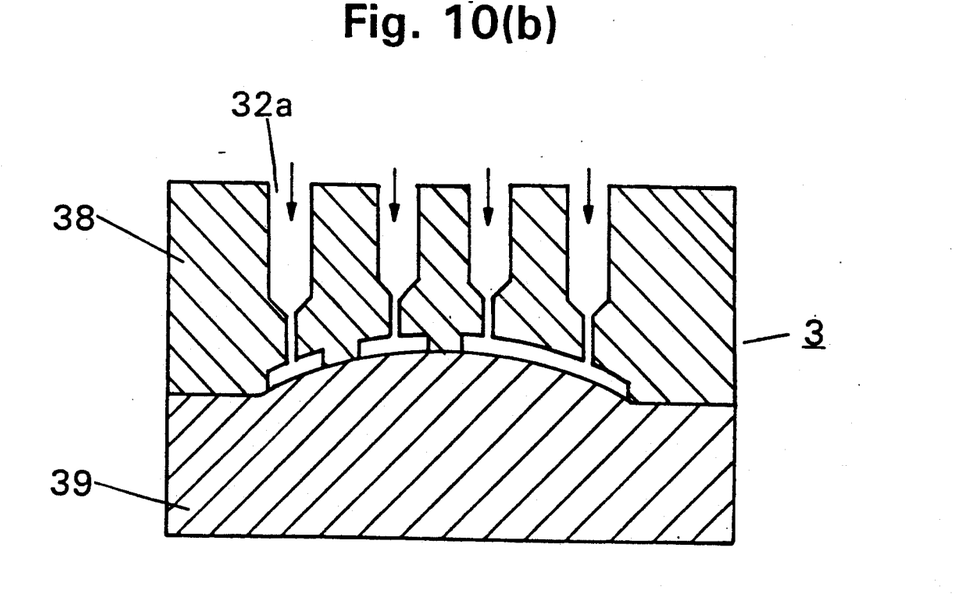
FIG. 10(b) is a cross-sectional view showing an injection mold.
Figure 11:
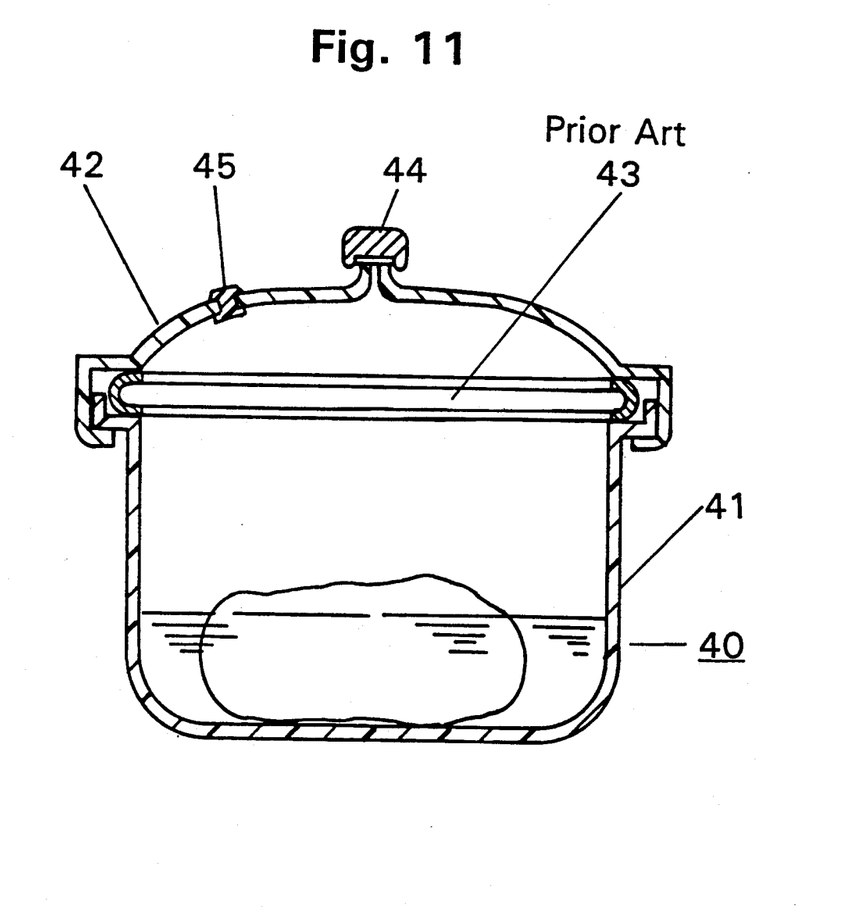
FIG. 11 is a cross-sectional view showing a conventional pressure cooker.

FIG. 10 shows a modified process in which the aperture 33 for the safety valve 7 is previously made, and additional gates 32a are produced such that one of them is located at the opposite position to one of the gates 32 situated along the aperture 31. The mold is halved into an upper mold 38 and a lower mold 39. A molten plastic is poured into a cavity in the mold through gates 32 and 32a. The molten plastic flows as shown in FIG. 10(b) without producing the weld line. A test showed that the container 1 produced by this process withstood a pressure of 10 kg/cm$^2$.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A pressure cooker for use in an electric range, the pressure cooker comprising a pressure container with an inside bottom for accommodating food to be cooked, a lid for covering the container in an airtight manner, a pressure control device for adjusting the internal pressure in the container, wherein at least one of the container and the lid comprises a composite resin consisting essentially of polyphenylene sulfide resin and 30 wt % to 50 wt % glass fiber.

2. A pressure cooker according to claim 1, wherein the composite resin has a tensile strength of 500 kg/cm$^2$ to 2500 kg/cm$^2$.

3. A pressure cooker for use in an electric range according to claim 1, wherein in the pressure container a cooking tray, on which the cooking food is placed, is disposed at a distance from the inside bottom of the container, the said cooking tray comprising a microwave absorptive layer at least in the portions thereof which come into contact with the cooking food.

4. A pressure cooker according to claim 1, wherein at least one of the container and the lid has fluororesin coatings in portions thereof which come into contact with the cooking food.

5. The pressure cooker according to claim 1 wherein the electric range is a microwave oven.

6. A pressure cooker for use in an electric range, the pressure cooker comprising a pressure container for accommodating food to be cooked, a lid for covering the container in an airtight manner, a pressure control device for adjusting the internal pressure in the container, and a safety valve for escaping excess vapor inside, wherein at least one of the container and the lid comprises a composite resin consisting essentially of polyphenylene sulfide resin and 30 wt % to 50 wt % glass fiber.

7. The pressure cooker according to claim 3 wherein the electric range is a microwave oven.

8. A pressure cooker comprising a pressure container for accommodating food to be cooked, a lid for covering the container in an airtight manner, a pressure control device for adjusting an internal pressure in the container, wherein at least one of the container and the lid comprises an injection molded composite resin consisting essentially of polyphenylene sulfide resin and glass fiber of 30 wt % to 50 wt %.

9. A process for making a pressure cooker having a pressure container, a lid for covering the container, and a pressure control aperture, the process comprising a step of making at least a part of one of the container and the lid from a composite resin consisting essentially of polyphenylene sulfide resin and glass fiber of 30 wt % to 50 wt % by injection, wherein the pressure control aperture is closed during the injection process and mechanically made through after the injection process is finished.

10. A process for making a pressure cooker having a pressure container, a lid for covering the container, and a pressure control aperture, the process comprising the step of making at least a part of one of the container and the lid from a composite resin consisting essentially of polyphenylene sulfide resin and 30 wt % to 50 wt % glass fiber by injection, wherein a plurality of sprues are produced in the portions made of the composite resin such that at least two of the sprues are situated at opposite positions with the pressure control aperture being interposed therebetween.

* * * * *